INVENTORS
GEORGE A. KENDALL
NORMAN E. HESS
BY
*Fearman + Fearman.*
ATTORNEYS

INVENTORS
GEORGE A. KENDALL
NORMAN E. HESS
BY
*Pearman & Pearman.*
ATTORNEYS

Sept. 7, 1965  G. A. KENDALL ETAL  3,204,782
MECHANISM FOR CRANKSHAFT LATHES
Filed June 27, 1956  3 Sheets—Sheet 3
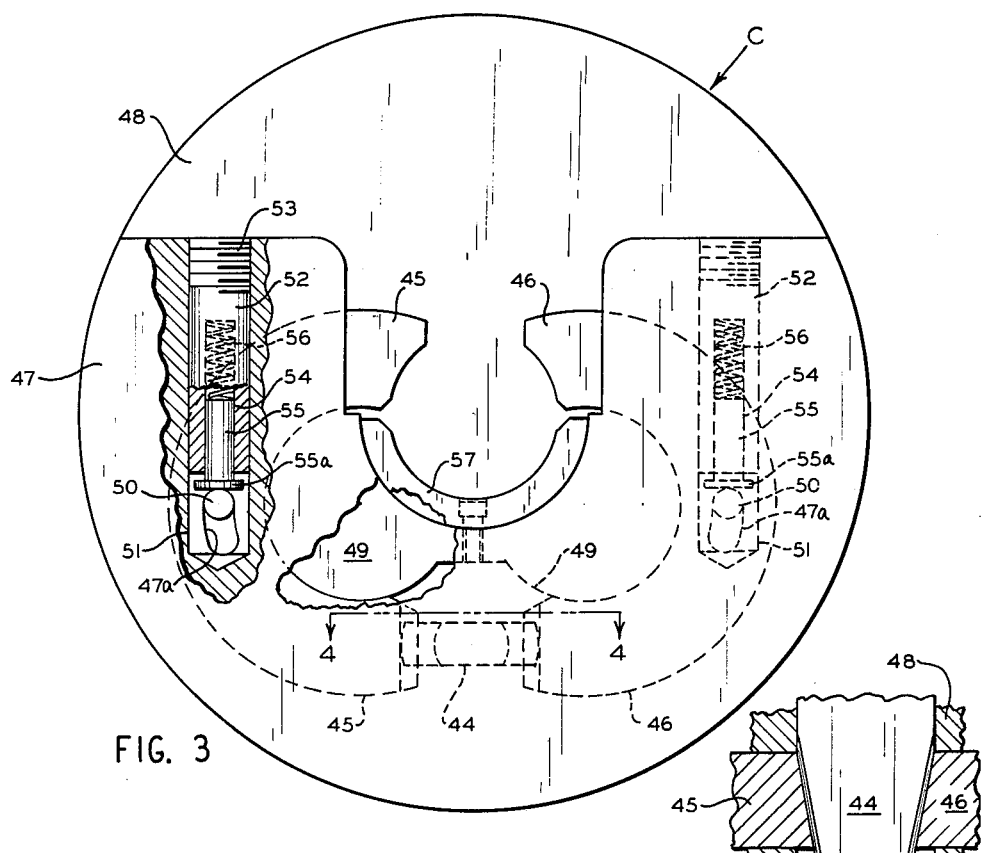
FIG. 3
FIG. 4
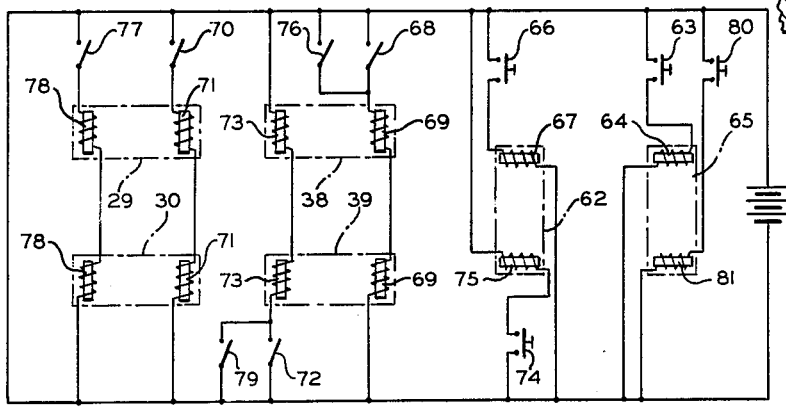
FIG. 5
INVENTORS
GEORGE A. KENDALL
NORMAN E. HESS
BY
ATTORNEYS

United States Patent Office 3,204,782
Patented Sept. 7, 1965

3,204,782
MECHANISM FOR CRANKSHAFT LATHES
George A. Kendall and Norman E. Hess, Saginaw, Mich., assignors to The Wickes Corporation, a corporation of Michigan
Filed June 27, 1956, Ser. No. 594,199
9 Claims. (Cl. 214—1)

This invention relates to multiple spindle crankshaft lathes and more particularly to certain new and useful improvements in loading and unloading mechanisms therefor.

One of the primary objects of the invention is to provide an improved automatic loading and unloading apparatus of simple and practical design for presenting workpieces to the spindles of crankshaft machine tools and removing them therefrom.

Another object of the invention is to design a unitary workpiece handling crane for a lathe with vertically spaced sets of work spindles which unloads a plurality of finished workpieces from the spindles and replaces them with a plurality of rough unmachined workpieces without any attention on the part of the machine operator other than operation of a push button control system.

A further object of the invention is to design an automatic loading and unloading mechanism for a crankshaft machining lathe wherein a longitudinally moving slide carries a set of vertically traveling slides thereon for moving swingable work carrying arms thereon in a substantially linear, vertical path of travel into and out of engagement with the workpieces.

Another object of the invention is to provide apparatus of the character described in which bell crank type arms or levers mounted on vertical slides can be employed to transport the workpieces to and from work holding chucks on the spindles.

A further object of the invention is to provide an automatic crankshaft loading and unloading crane of a more compact nature which is utilizable with a machine wherein the crane supporting rail is provided on one side of the lathe without unbalancing the lathe from the standpoint of sound design nor requiring an undue amount of space for operation.

Another object of the invention is to provide improved apparatus of the type described which need not be mounted on top of the lathe so as to occupy valuable head space and need not employ outwardly projecting arms from which the work support cranes are suspended as do other lathes of this type with which we are familiar.

A further object of the invention is to provide loading and unloading mechanism for a crankshaft lathe suitable for presenting workpieces to the work support spindles in a predetermined oriented position relative to their main axes of rotation so as to pre-position a series of pre-machined locating spots on the crankshafts in predetermined positions relative to locating pads on the chucking devices.

Another object of the invntion is to design mechanism of the character described for moving said crankshafts in predetermined sequence longitudinally in a linear path of travel, laterally in a relatively flat arcuate path, and vertically in a linear path of travel.

A still further object of the invention is to design an automatic loading and unloading mechanism for crankshafts which is relatively economical to manufacture and assemble on standard lathes.

With the above and other objects in view, the present invention consists in the combination and arrangement of parts hereinafter more fully described, illustrated in the accompanying drawings, and more particularly pointed out in the appended claims, it being understood that equivalent changes may be made in the various elements which comprise the invention without departing from the spirit thereof or the scope of the appended claims.

In the drawings:

FIG. 3 is an elevational view on an enlarged scale illustrating a type of chuck which may be employed to hold the workpieces.

FIG. 4 is a sectional view taken on the line 4—4 of FIG. 3.

FIG. 5 is a circuit diagram illustrating electrical controls which may be employed for automatically operating the mechanism.

Figure 1:
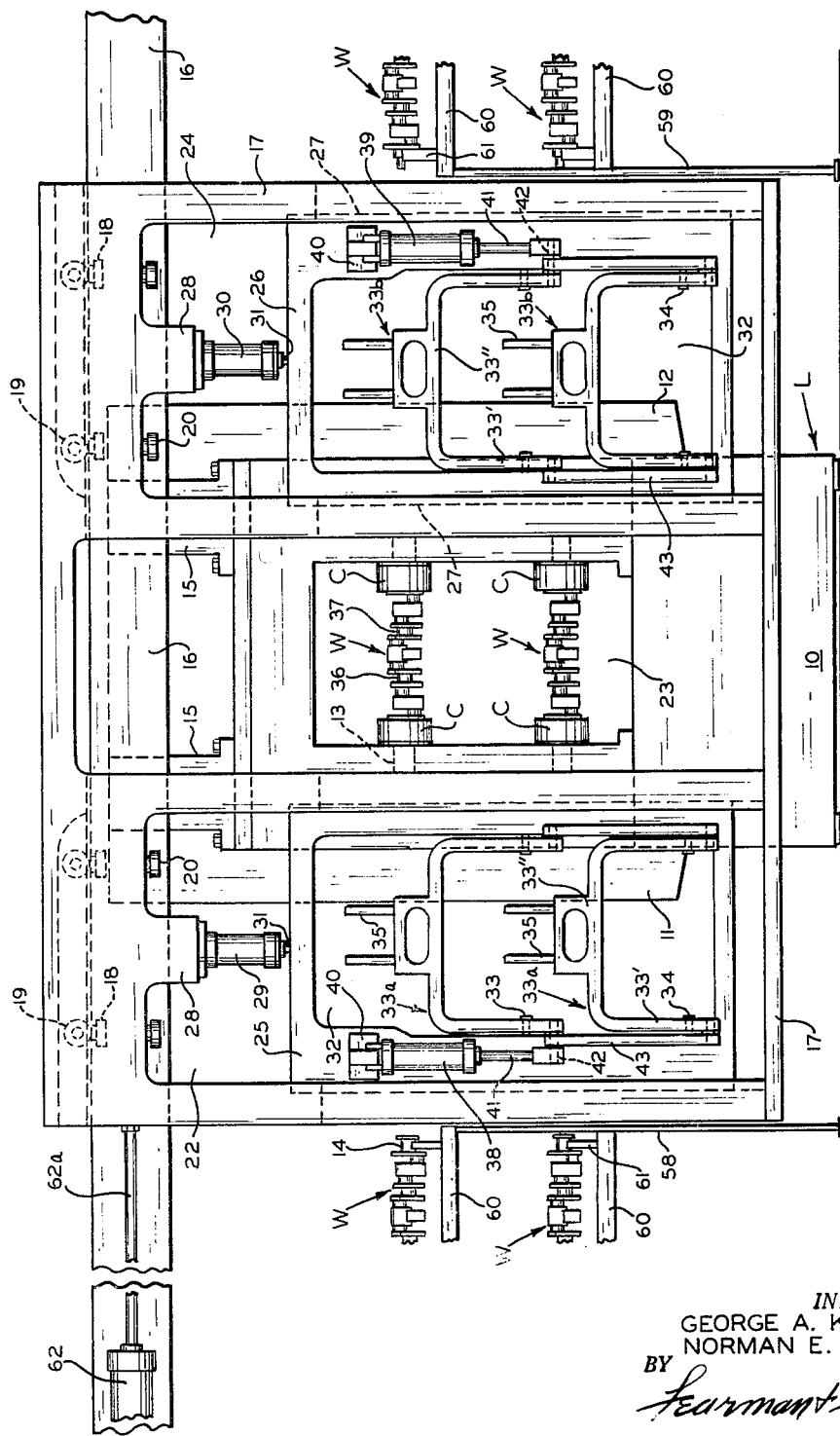
FIG. 1 is a front elevational view of the improved loading and unloading mechanism showing it applied to a multiple spindle crankpin machining lathe.

Referring now more particularly to the accompanying drawings in which we have shown a preferred embodiment of the invention, a letter L generally indicates a crankshaft lathe such as shown in Patent Number 2,653,502 wherein sets of vertically spaced spindles are provided. Since lathes of this type are conventional, only certain elements thereof which are desirable to illustrate our invention need be shown. The lathe L has the usual base 10 and upright end housings 11 and 12 in which are journaled the work spindles 13 which have power operated chucks C (to be later described in detail) for gripping the end portions 14 of the crankshafts W.

Provided on the end housings 11 and 12 are crane rail brackets 15 which function as rigid supports for the longitudinally disposed crane rail 16 and it will be observed (FIGURE 2) that the crane rail 16 does not project appreciably above the lathe L and is disposed just outwardly of the front wall of the base 10.

Mounted on the rail 16 is a crane or crane frame 17 which is formed with an angular section 17a adapted to hook over the rail 16, the section 17a including laterally disposed rollers 18 bearing on the rear face of rail 16 and rollers 19 supporting the frame 17 on the top face of rail 16. Each of the load carrying rollers 18 and 19, and each of the laterally disposed rollers 20 which engage the front face of rail 16, are mounted on suitable antifriction bearings to permit the crane frame to travel easily on the rail while still rigidly supporting it thereon. Also the lower edge of frame 17 is provided with a hook shaped section 17b which is received in a channel type guide 21 provided on the base 10.

It will be observed that vertically extending openings 22, 23, and 24 are provided in the frame 17 and appreciably reduce its weight. Slides 25 and 26 are vertically slidable in guide grooves 27 provided in the marginal side walls of the crane frame adjacent openings 22 and 24 and travel accordingly in a vertically linear path. Fixed on brackets 28 provided at the upper ends of the crane 17 within openings 22 and 24 are fluid pressure cylinders 29 and 30 which have piston rods 31 connected fast to the slides 25 and 26 as shown to move the latter vertically in the loading and unloading sequences.

Each vertical slide 25 and 26 is actually a slide frame since openings 32 are provided therein to receive sets of bell crank lever like, crankshaft engaging and transporting frames or members 33a and 33b of generally U shape. The legs 33′ of the members 33a and 33b are in the form of bell crank levers which are pivotally mounted intermediate their ends on pins or trunnions 34 which are fixed in the marginal side rails of the slides 25 and 26 as shown. The body portions 33″ of the members 33a and 33b have support arms or hooks 35 with recesses 35a arranged to support the crankshafts from underneath, the arms 35 being spaced apart a distance such that they engage the crankpins 36 and 37 of the crankshafts W when transporting them.

Figure 2:
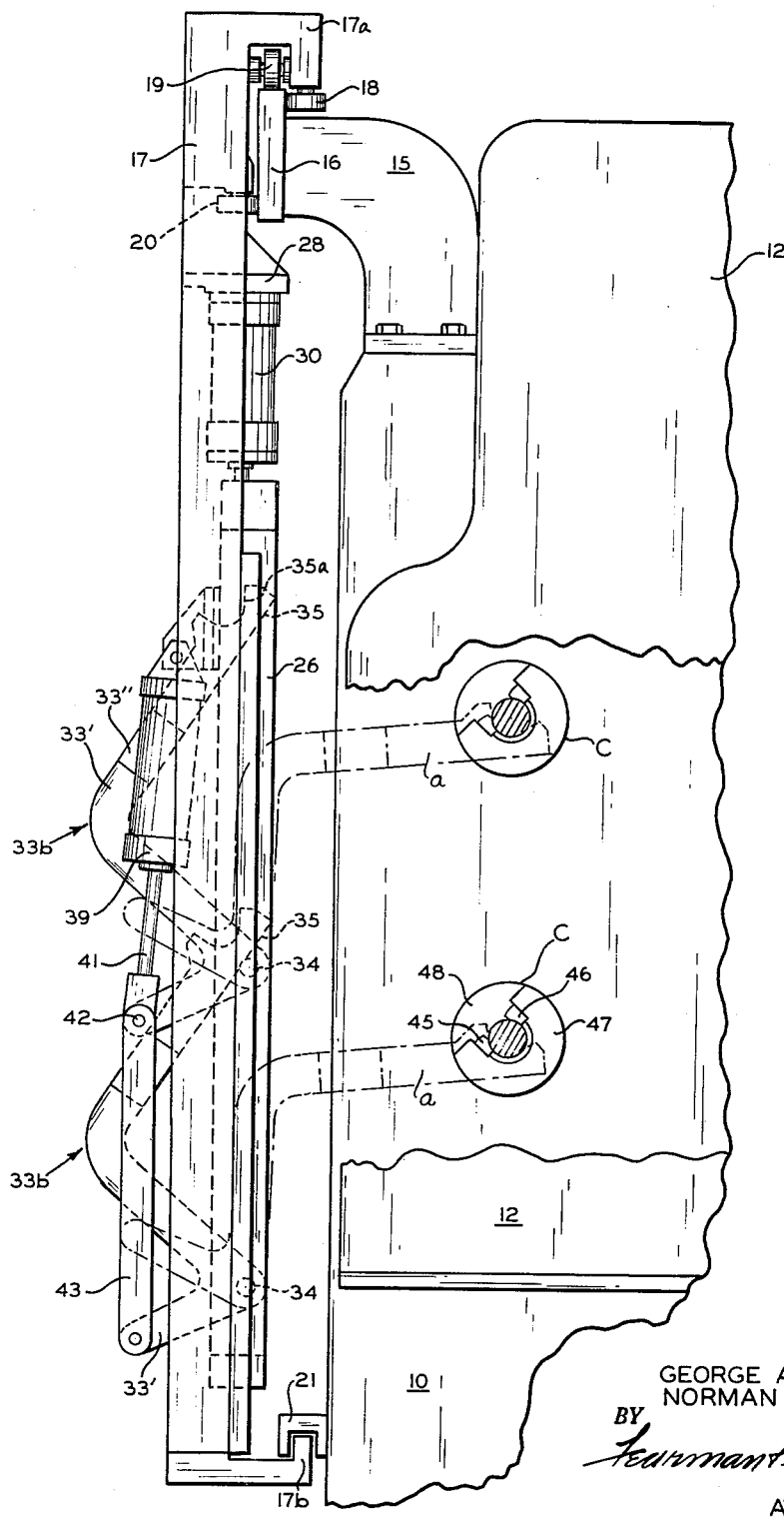
FIG. 2 is an end elevational view on an enlarged scale and partly in section, with the diagrammatic lines illustrating other positions of the work carrying levers.

In order to actuate the lever members 33a and 33b conventional double acting fluid pressure cylinders 38 and 39 are pivotally provided on brackets 40 on the outer side rails of the slides 25 and 26 respectively. The piston rods 41 of these cylinders are connected to the lower ends of the upper work transporting members 33a and 33b by pins 42 and links 43 carried by the pins 42 connect the piston rods 41 to the lower ends of the lower transport members 33a and 33b. In FIG. 2 of the drawings the rods 41 are shown in "out" or extended position as though the members 33a and 33b (which are, however, shown as empty in the interest of clarity) have been swung outwardly in unison from positions, axially opposite the chucks C, indicated by the diagrammatic lines at "a."

The chucks C are preferably of the type illustrated in FIGS. 3 and 4 in which a power actuated wedge 44 connected to a double acting fluid pressure cylinder acts to close the jaws 45 and 46 which are carried between chuck side plates 47 and 48. The jaws 45 and 46 guide on curvilinear sections of a spacer 49, which connects the side plates 47 and 48, and have projecting pins 50 intermediate their ends which extend up through slot slots 47a in plate 47 into bored openings 51 provided in the outer chuck plate 47. Studs 52 threaded as at 53 in the openings 51 have bores 54 in which are pins 55 urged outwardly by springs 56. The pins 55 have heads 55a engaging the pins 50 and the springs 56 will open the jaws of the chuck of course, when permitted to do so on withdrawal of the wedge actuator 44. The chuck in FIG. 3 is shown as having a locating pad 57 bolted to spacer 49. Positioned at each end of the lathe L are racks 58 and 59 as usual which have horizontal rails 60 carrying support bars 61 similar to those shown in Patent 2,653,502 referred to previously. The racks 58 and 59 are located rearwardly of the longitudinal path of travel of crane frame 17 and the rack 58 is designed to support the foremost crankshafts on bars 61 in axial alignment with the crankshafts which are carried by the chucks C. The bars 61 on the rack 58, which carry rough unfinished crankshafts, may be sloped forwardly slightly so that other crankshafts on the rack rearwardly of the foremost crankshafts slide into position for removal when a given set of crankshafts have been removed for loading. The bars 61 on the rack 59 will be sloped rearwardly, however, so that crankshafts machined on the lathes and thence removed and deposited on the rack 59 will slide rearwardly after their deposit to provide space for deposit of the next set of crankshafts. The racks 58 and 59 need not be shown or described in entirety since they can be of the same design as those shown in the patent referred to. A double acting pressure fluid cylinder 62 on rail 16 has its piston rod 62a connected to the slide frame 17 to move the frame longitudinally on the rail as desired.

During the normal turning and cutting operation of the lathe L when crankshafts or workpieces W are mounted in the chucks C the slide frame 17 may be positioned in an intermediate position on rail 16 as in FIG. 1 with each member 33a and 33b in forward or outward position. In this intermediate or "rest" position the slides 25 and 26 will be in "down" position. At the conclusion of the machining cycle the work spindles 13 and chucks C are stopped in a predetermined rotary position (which is demonstrated in FIG. 2) by well known mechanism of any suitable design which forms no part of this invention. The operator then presses button 63 on a control panel and energizes the solenoid 64 of a conventional double acting fluid pressure cylinder 65 which is provided to actuate each wedge 44. In FIG. 5, for the sake of convenience, only one cylinder is depicted but the other other is connected in exactly the same way, of course. The chucks and their manner of operation form no part of the instant invention. Springs 56 then open the jaws 45 and 46. Each of the other double acting, fluid pressure cylinders described in the application may be provided with a pair of built-in solenoid operated valves for admitting fluid to one end of the cylinder and bleeding of fluid from the other end of the cylinder, and for reversing the piston in the cylinder by admitting fluid and bleeding it oppositely. Such cylinders are conventional and need not be illustrated except schematically as in FIG. 5.

To unload the machine crankshafts and load replacement crankshafts from the left rack 58 into the open chucks C the operator presses the load push button 66 which energizes the solenoid valve 67 in the traverse cylinder or motor 62 and positions it to supply fluid to its piston in such a manner as to move the crane 17 to the left to a position wherein the slide 26 is in front of the work spindles of the lathe and the slide 25 is in front of the unfinished crankshaft workpiece supply rack 58. When the crane 17 has reached its extreme left hand position a normally open limit switch 68 in its path is closed and solenoid valves 69 in cylinders 38 and 39 are energized. The piston rods 31 of the cylinders 29 and 30 are extended when the apparatus is at rest so that the slides 25 and 26 are down and when the members 33a and 33b are swung inwardly they do not engage crankshafts on the left rack 58 or in the chucks C but swing past them to a position underneath them. Energization of the solenoid valves 69 in cylinders 38 and 39 positions them so as to force the pistons in the cylinders to pull the piston rods 41 inwardly or upwardly and swings the members 33a and 33b inwardly to dispose the hooks or arms 35 under the crankshafts on rack 58 and in chucks C. The hooks 35 on arms or members 33a and 33b will be disposed just under these crankshafts. Since a normally open limit switch 70 in the path of one of the members is then tripped the solenoid valves 71 of cylinders 29 and 30 are immediately energized when the sections are swung inwardly and positioned to admit fluid so that the pistons of these cylinders rise slides 25 and 26. This movement brings the hooks 35 up into engagement with the crankshafts on rack 58 and in chucks C and lifts them out of the rack and chucks. Normally open limit switch 72 in their path is closed at this time to energize the solenoid valves 73 of cylinders 38 and 39 which direct fluid to reverse the pistons therein, and the members 33a and 33b bearing crankshafts from the rack 58 and chucks C are swung outwardly or forwardly. Button 74 can then be pressed by the operator to energize the solenoid valve 75 of traverse cylinder 62 which directs fluid to reverse the piston therein and travels the crane frame 17 to the right until the slide 25 is opposite the chucks C and the slide 26 is opposite the right rack 59. When the crane reaches the end of its travel to the right a normally open limit switch 76 on rail 16 is engaged and tripped to energize solenoid valves 69 and the sections 33a and 33b are swung rearwardly or inwardly to move the crankshafts from rack 58 to a position just above the chucks C and the crankshafts from chucks C to the right rack 59. Thence a normally open limit switch 77 in the path of the sections is closed and the valve solenoids 78 of cylinders 29 and 30 are energized to direct pressure to their pistons in a manner to force slides 25 and 26 to descend out of engagement with the crankshafts, which are deposited in the chucks and on the rack 59, to a position in which the hooks on members 33a and 33b will swing outwardly clear of the crankshafts deposited by the hooks. Normally open limit switch 79 in the path of the slides is tripped at this time to energize the solenoid valves 73 and direct pressure fluid to force pistons in cylinders 38 and 39 to swing the emptied members 33a and 33b outwardly and the operator can return the crane frame 17 to original position by pressing button 66 for a length of time sufficient to return the crane 17 the desired distance leftward. The chuck jaws 45 and 46 are closed by pressing button 80 and energizing the solenoid 81 in valve 65 which reverses the pistons in the chuck jaw actuating cylinders and forces the wedge actuators 44 outwardly.

The control circuit illustrated is shown for purposes of convenience and simplicity only and may vary considerably. For instance, if the push button 80 is replaced by a limit switch which is energized at the end of the machining cycle and the buttons 66, 74, 80 are likewise replaced by limit switches in the path of the moving elements the operation can be entirely automatic and the machine will operate without any attention from the operator to continuously machine crankshafts. All of the various component elements thereof are conventional as will be recognized. The disposition of the various limit switches in the paths of the various elements will be such that the movements described will be carried out and the location of the switches forms no part of the instant invention.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

We claim:

1. In work handling apparatus for supplying workpieces to and removing them from vertically spaced axes of rotation on which pieces of work may be rotated; a frame; a longitudinally disposed carriage rail adapted to be mounted on said frame arranged parallel to the axes of rotation; a vertically extending carriage movable longitudinally on said rail; a vertically movable slide on said carriage; and a pair of vertically spaced, bell cranklike, work carrying cradle members movable vertically with said slide having work supporting arms at the upper ends thereof pivotally mounted intermediate their ends on said slide to swing said arms from a position outward of said axes in to said axes, said arms having vertically accessible, upper edge work holding and engaging surface at the upper ends thereof; a drive motor supported by said frame connected to said slide for moving it vertically, a drive motor supported by said frame connected to said carriage for moving said carriage longitudinally, a link connecting said cradle members; and a drive motor connected to said link separate from said previously mentioned drive motors so that the swing of said cradle members in unison will not be affected by said previously mentioned motors and said cradle members can be sequentially operated with said crane and slide.

2. The combination defined in claim 1 in which said carriage comprises an open frame mounting said slide; said slide has an opening therein to accommodate said bell crank members; and said vertically spaced bell crank members on the slide are generally U-shaped with angular legs pivotally mounted near their lower ends in said openings, said latter drive motor comprises a fluid pressure cylinder on the slide having its piston rod connected to the lower end of the upper bell crank cradle member thereon on one side thereof, and said link connects the lower end of the lower bell crank member with the lower end of the upper bell crank member whereby said members are operated in unison.

3. In work transfer apparatus for use in supplying and removing a workpiece to an axis having longitudinal limits; longitudinally extending carriage guide means mounted above said axis; vertically extending carriage means movable longitudinally on said guide means above said axis from points longitudinally remote from the axis to a position longitudinally opposite the axis; first motor means for moving said carriage means; at least one slide carriage by said carriage means for movement in a generally vertical plane a spaced distance laterally outward of the vertical plane of said axis; a work carrying transfer member pivotally mounted on said slide; pivot means for said slide for connecting said transfer member to said slide; second motor means connected to said slide to move said slide from an upper position downwardly to a position in which said pivot means is below the said axis; said transfer member having arm means extending upwardly from said pivot means and having a vertically accessible, generally concave, upper edge work holding surface on the upper end thereof; and third motor means connected to said transfer member for moving said arm means relatively to said slide in a downward arc from a position outward of said axis substantially in to the axis.

4. The combination defined in claim 3 in which said transfer member includes a leg section extending outwardly from said pivot means and said arm means includes a section extending generally perpendicularly upwardly from said leg section when the arm means is in out position.

5. The combination defined in claim 4 in which said third motor means is connected to move said leg section in a vertical plane in a vertical direction opposite to the vertical direction in which said work engaging surface will move upon movement of said leg section.

6. The combination defined in claim 4 in which said leg section is relatively short compared to said intermediate section and extends outwardly while the section on which said work holding surface is located extends in an opposite direction.

7. The combination defined in claim 4 in which said leg section is the lower end of said work carrying member, and said member is pivoted to said slide at the juncture of said leg section and intermediate section, the work holding surface being the upper end of the member.

8. The combination defined in claim 3 in which, in transferring the workpieces in to the axis, means is provided for operating the third motor means to move the arm means inwardly to a position just above the axis, and then to operate the second motor means to move the slide and arm means downwardly to deposit the workpieces at the axis and move the arm means to a position low enough so that when swung outwardly it will clear the workpiece deposited.

9. In work handling apparatus for supplying workpieces to and removing them from vertically spaced axes of rotation on which pieces of work may be rotated; a frame; a longitudinally disposed carriage rail adapted to be mounted on said frame arranged parallel to the axes of rotation; a vertically extending carriage movable longitudinally on said rail; a vertically movable slide on said carriage; and a pair of vertically spaced, work carrying cradle members, movable vertically with said slide and having work supporting arms at the upper ends thereof, pivotally mounted on said slide to swing said arms from a position outward of said axes substantially in to said axes, said arms having vertically accessible, upper edge work holding and engaging surface at the upper ends thereof; vertically spaced pivot means connecting said cradle members to said slide; a drive motor supported by said frame connected to said slide for moving it vertically to a lower position in which each pivot means is below one of the axes of rotation; a drive motor supported by said frame connected to said carriage for moving said carriage longitudinally; and drive motor means connected to pivot said cradle members independently of said previously mentioned drive motors so that the swing of said cradle members in unison will not be affected by said previously mentioned motors and said cradle members can be sequentially operated with said crane and slide.

References Cited by the Examiner

UNITED STATES PATENTS

| | | | |
|---|---|---|---|
| 2,221,049 | 11/40 | Groene | 82—9 X |
| 2,305,868 | 12/42 | Groene | 212—135 |
| 2,602,552 | 7/52 | Orloff | 212—59 |
| 2,623,429 | 12/52 | Meyer | 82—2.7 |
| 2,624,470 | 1/53 | Geist | 212—135 |
| 2,653,502 | 9/53 | Meyer | 82—2.5 |
| 2,704,955 | 3/55 | Kendall. | |
| 2,739,717 | 3/56 | Dinsmore | 214—1 |
| 2,746,613 | 5/56 | Meyer | 212—135 |
| 2,751,781 | 6/56 | McConnell. | |
| 2,771,716 | 11/56 | Joyce | 82—2.5 |
| 2,792,953 | 5/57 | King. | |
| 2,807,974 | 10/57 | Meyer | 82—9 |
| 2,867,058 | 1/59 | Balsiger. | |

HUGO O. SCHULZ, *Primary Examiner.*

R. E. BEALL, WILLIAM W. DYER, JR., ERNEST A. FALLER, JR., *Examiners.*